(12) United States Patent
Ishibashi et al.

(10) Patent No.: US 8,238,573 B2
(45) Date of Patent: Aug. 7, 2012

(54) CONFERENCE APPARATUS (75) Inventors: Toshiaki Ishibashi, Fukuroi (JP); Ryo Tanaka, Hamamatsu (JP); Satoshi Ukai, Hamamatsu (JP)

(73) Assignee: Yamaha Corporation (JP)

( * ) Notice: Subject to any disclaimer, the term of this patent is extended or adjusted under 35 U.S.C. 154(b) by 1078 days.

(21) Appl. No.: 12/091,406

(22) PCT Filed: Jul. 31, 2006

(86) PCT No.: PCT/JP2006/315557
§ 371 (c)(1),
(2), (4) Date: Apr. 24, 2008

(87) PCT Pub. No.: WO2007/122749

PCT Pub. Date: Nov. 1, 2007

(65) Prior Publication Data

US 2009/0147967 A1 Jun. 11, 2009

(30) Foreign Application Priority Data

Apr. 21, 2006 (JP) ................................. 2006-118239

(51) Int. Cl.
*H04R 3/00* (2006.01)
(52) U.S. Cl. ............. 381/92; 381/91; 381/122; 379/122; 348/14.16; 348/E7.077; 348/E7.083
(58) Field of Classification Search .................... None
See application file for complete search history.

(56) References Cited

U.S. PATENT DOCUMENTS

| | | | | |
|---|---|---|---|---|
| 2,496,031 A | * | 1/1950 | Anderson et al. | 367/126 |
| 3,794,766 A | * | 2/1974 | Cox et al. | 381/66 |
| 5,581,620 A | * | 12/1996 | Brandstein et al. | 381/92 |
| 5,657,393 A | * | 8/1997 | Crow | 381/92 |
| 5,778,082 A | * | 7/1998 | Chu et al. | 381/92 |
| 6,069,961 A | * | 5/2000 | Nakazawa | 381/92 |
| 6,449,593 B1 | | 9/2002 | Valve | |
| 2001/0028720 A1 | * | 10/2001 | Hou | 381/92 |
| 2001/0033649 A1 | * | 10/2001 | Rogers | 379/388.01 |

(Continued)

FOREIGN PATENT DOCUMENTS

EP 1116961 A2 7/2001

(Continued)

OTHER PUBLICATIONS

Search report issued in corresponding application No: PCT/JP2006/315557, dated Oct. 19, 2006.

(Continued)

*Primary Examiner* — Hrayr A Sayadian
(74) *Attorney, Agent, or Firm* — Rossi, Kimms & McDowell LLP (57) ABSTRACT

Microphone arrays, which are formed by arranging a plurality of microphones, are provided on a front side and a rear side of a housing, respectively. A virtual focus is set for each of the microphone arrays in a direction opposite to a direction in which sound is picked-up sound signals picked up by the plurality of microphones are delayed such that distances to the virtual focus are the same, and the delayed sound signals are synthesized. Therefore, sound in a sound-pickup area of a predetermined angle on each of the front side and the rear side can be picked up at a high level, and even though there is a noise source in areas other than the sound-pickup area, noise from the noise source is not picked up.

20 Claims, 9 Drawing Sheets

U.S. PATENT DOCUMENTS

| | | |
|---|---|---|
| 2002/0069054 A1 | 6/2002 | Arrowood et al. |
| 2003/0118200 A1 | 6/2003 | Beaucoup et al. |
| 2005/0008169 A1* | 1/2005 | Muren et al. .................... 381/92 |
| 2005/0111674 A1* | 5/2005 | Hsu ................................. 381/92 |
| 2005/0141735 A1* | 6/2005 | Kim .............................. 381/313 |
| 2006/0045289 A1* | 3/2006 | Kujirai et al. ................... 381/92 |
| 2008/0181430 A1* | 7/2008 | Zhang et al. .................... 381/92 |
| 2008/0285771 A1* | 11/2008 | Tanaka et al. ................... 381/92 |

FOREIGN PATENT DOCUMENTS

| | | |
|---|---|---|
| EP | 1289247 A2 | 3/2003 |
| JP | 58-151796 A | 9/1983 |
| JP | 5-158492 A | 6/1993 |
| JP | 8-298696 A | 11/1996 |
| JP | 2005-184386 A | 7/2005 |

OTHER PUBLICATIONS

Office Action issued in corresponding Chinese application No. 200680040082.6 dated Feb. 7, 2011.

* cited by examiner

CONFERENCE APPARATUS

This application is a U.S. National Phase Application of PCT International Application PCT/JP2006/315557 filed on Jul. 31, 2006 which is based on and claims priority from JP 2006-118239 filed on Apr. 21, 2006, the contents of which is incorporated herein in its entirety by reference.

BACKGROUND ART

The present invention relates to a sound pickup device that picks up sound from a desired area using a microphone array, and to a voice conference apparatus, to which the sound pickup device is applied.

In the past, voice conference apparatuses have been proposed as apparatuses for performing a voice conference among remote places (for example, see Patent Documents 1 and 2). The voice conference apparatus has a function of picking up sound of attendants of a voice conference and transmitting sound to remote voice conference apparatuses.

There are often many attendants in the conference, and thus the voice conference apparatus needs to pick up sound of each attendant at the same level and at a level as high as possible. In addition, when the attendant moves, the voice conference apparatus needs to prevent the attendant from departing from a sound-pickup area despite the attendant's movement. Further, when there is often a noise source, such as a projector and so on, in a conference room, the voice conference apparatus needs to set a sound-pickup area so that noise is not picked up.

The voice conference apparatus disclosed in Patent Document 1 includes microphones provided at four corners of a housing having a substantially square shape, thereby picking up sound signals in different directions. The voice conference apparatus disclosed in Patent Document 2 delays the sound signals picked up by two non-directional microphones on left and right sides for an appropriate time and synthesizes the delayed sound signals, such that sound of a plurality of speakers can be extracted at a high gain.

Patent Document 1: JP-A-8-298696
Patent Document 2: JP-A-5-158492

However, in the apparatus disclosed in the Patent Document 1, the four microphones simply pick up the sound signals in different directions. Accordingly, when a noise source exists in a conference room, the apparatus cannot avoid picking up noise from the noise source. Further, it is impossible to increase levels of the picked-up sound signals by synthesis or the like.

In the apparatus disclosed in the Patent Document 2, it is possible to pick up sound (a speaker's speaking) generated at a predetermined position at a high level by delaying the sound signals picked up by the two microphones and synthesizing the delayed signals. In this apparatus, however, the position where a high-level signal can be obtained by synthesis is in a narrow range of a spot shape. Accordingly, when the speaker moves, it is difficult to follow the movement of the speaker (an attendant in a conference). In addition, when a plurality of attendants speak at the same time, a plurality of sets of delay circuits are needed to pick up sound at the same time. As a result, the configuration of the apparatus becomes complex.

DISCLOSURE OF THE INVENTION

Accordingly, in order to solve the above-described problems, and it is an object of the invention to provide a sound pickup device that can pick up speaking of plural persons at a high level at the same time and, even though there is a noise source in a room, can prevent noise from being picked up, and a voice conference apparatus.

In order to solve the problem, the present invention is characterized by having the following arrangement.

(1) A sound pickup device comprising:

a microphone array including a plurality of microphones arranged therein; and a signal processing unit that performs an area sound-pickup processing in which a virtual focus is set in a direction opposite to a sound-pickup area where sound is to be picked up by the microphone array, sound signals picked up by the plurality of microphones are respectively delayed such that distances from the plurality of microphones to the virtual focus are the same, and the delayed sound signals are synthesized.

(2) The sound pickup device according to (1) further comprising:

a storage unit that stores information of a plurality of sound-pickup areas and information of a plurality of virtual focuses for picking up sound of the individual sound-pickup areas; and an area selecting unit that selects at least one areas from the plurality of sound-pickup areas, wherein the signal processing unit sets the virtual focus for picking up sound of the sound-pickup area selected by the area selecting unit.

(3) The sound pickup device according to (1) or (2), wherein the signal processing unit performs a spot sound-pickup processing in which a focus is set to a sound-pickup spot, sound signals picked up by the plurality of microphones are delayed such that distances from the plurality of microphones to the sound-pickup spot are the same, and the delayed sound signals are synthesized.

(4) The sound pickup device according to (3), wherein the signal processing unit synthesizes the sound signal picked up by the spot sound-pickup processing and the sound signal picked up by the area sound-pickup processing and outputs the synthesized sound signal or selectively outputs one of the sound signal picked up by the spot sound-pickup processing and the sound signal picked up by the area sound-pickup processing.

(5) The sound pickup device according to (3), further comprising a mode selecting unit that receives a selection operation of one of the spot sound-pickup processing and the area sound-pickup processing and instructs the signal processing unit to perform the selected processing.

(6) The sound pickup device according to (3), wherein the signal processing unit performs a sound source detection processing in which the spot sound-pickup processing is performed for each of the plurality of sound-pickup spots which are set within the sound-pickup area, and a position of the sound-pickup spot at which volume of the synthesized sound signals becomes maximum is output as a sound source position.

(7) The sound pickup device of (5), wherein the two microphone arrays are provided outward on two surfaces facing each other, and the two sound signal processing units are provided for the two microphone arrays, respectively, and the mode selecting unit instructs the two sound signal processing units to separately perform the spot sound-pickup processing or/and the area sound-pickup processing.

(8) A voice conference apparatus comprising:
  a housing;
  two microphone arrays that are provided outward on a front surface and a rear surface of the housing, each of the microphone arrays including a plurality of microphones arranged therein;
  a speaker array including a plurality of speakers linearly arranged at a bottom of the housing;
  two sound signal processing units that are provided for the two microphone arrays, respectively,
  wherein each of the sound signal processing units performs:
    an area sound-pickup processing in which a virtual focus is set in a direction opposite to a sound-pickup area where sound is to be picked up by the microphone array, sound signals picked up by the plurality of microphones are respectively delayed such that distances from the plurality of microphones to the virtual focus are the same, and the delayed sound signals are synthesized, and
    a spot sound-pickup processing in which a focus is set to a sound-pickup spot, sound signals picked up by the plurality of microphones are delayed such that distances from the plurality of microphones to the sound-pickup spot are the same, and the delayed sound signals are synthesized;
  a mode selecting unit that receives a selection operation of one of the spot sound-pickup processing and the area sound-pickup processing and instructs the signal processing unit to perform the selected processing; and
  a sound-emitting signal processing unit that supplies a sound signal to the speaker array.

(9) The voice conference apparatus according to (8) further comprising a camera for capturing an image of a conference room,
  wherein the signal processing unit performs a sound source detection processing in which the spot sound-pickup processing is performed for each of the plurality of sound-pickup spots which are set within the sound-pickup area, and a position of the sound-pickup spot at which volume of the synthesized sound signals becomes maximum is detected as a sound source position, and
  wherein the camera is controlled to be directed to the detected sound source position.

According to the invention, the focus is set at the back of the microphone array, and the sound signals are picked up at a wavefront converging on the focus. Here, "delaying sound signals picked up by the plurality of microphones such that distances to the virtual focus are the same" means that, even though distances between the plurality of microphones in the microphone array and the virtual focus are different from one another, sound-pickup signals of the microphones distant from the virtual focus are delayed such that the signals can be synthesized at a timing at which the plurality of microphones are arranged at a constant interval from the virtual focus.

With this processing, a range between two rays respectively passing through both ends of the microphone array from the virtual focus becomes a sound-pickup area. Therefore, it is possible to increase a sound-pickup level in the sound-pickup area by about 10 dB than sound-pickup levels of areas other than the sound-pickup area. As a result, sound in the sound-pickup area can be picked up at a high level, and noise of areas other than the sound-pickup area can be suppressed. In addition, since sound can collectively be picked up from a wide area of a predetermined angle, even though there are a lot of sound sources (multiple attendants in the conference) or the sound sources move, all sound can be picked up, without performing a switching processing or a tracking processing.

According to the invention, the plurality of sound-pickup areas and the virtual focuses corresponding to the sound-pickup areas are stored. If a user selects a sound-pickup area, the signal processing unit sets a virtual focus corresponding to the selected sound-pickup area, and performs sound-pickup. Therefore, the user only needs to select a desired sound-pickup area and does not need to set a virtual focus by assuming the sound-pickup area. As a result, a setting operation can be simplified.

According to the invention, the spot sound-pickup processing and the area sound-pickup processing are performed on the same place, and the sound signal of the spot sound-pickup processing and the sound signal of the area sound-pickup processing are synthesized and output or one of them is selected and output. When the sound signals are synthesized and output, sound (for example, a president's speaking or the like), which the user needs to carefully listen to, among sound can be emphasized while sound is picked up at a uniform level in a wide region (area). In addition, when one sound signal is selected and output, it is possible to automatically select an area sound-pickup mode on a scene where sound is generated simultaneously or randomly from the entire area (for example, a free discussion or a small talk), and a spot sound-pickup mode on a scene where sound is generated from one spot (for example, when a speaker is designated in a meeting).

According to the invention, the signal processing unit performs the spot sound-pickup processing, in addition to the above-described processing (the area sound-pickup processing). In the spot sound-pickup processing, sound-pickup beams are formed to be focused on the sound-pickup spots, sound of the sound-pickup spots picked up by all the microphones of the microphone array are synthesized while timings and phases are synchronized, and sound in a narrow range can be picked up at a high level. Therefore, the user can select a sound-pickup processing (sound-pickup mode) according to an aspect of a sound-pickup object.

According to the invention, the spot sound-pickup processing is performed by setting the plurality of sound-pickup spots in the sound-pickup area according to the area sound-pickup processing. The spot sound-pickup processing is not to extract the sound signals but to detect a volume of sound from each of the sound-pickup spots. In addition, according to the spot sound-pickup processing, it is determined that a sound source is located at the sound-pickup spot from which the sound signal of the maximum volume is picked up, and sound source position information is output. Therefore, even though the area sound-pickup processing is performed over a wide range, it is possible to obtain the sound source position information on the picked up sound signal.

According to the invention, the microphone arrays are provided outward on the two surfaces facing each other (for example, a front surface and a rear surface), respectively, and the sound signals are picked up from the outsides of the two surfaces (for example, a front side and a rear side), respectively. In addition, the mode selecting unit separately selects the sound-pickup processing of each of the two surfaces. Therefore, it is possible to select the appropriate sound-pickup processing according to an aspect of a sound source of each side.

According to the invention, it is possible to collectively pick up sound from a wide sound-pickup area of a predetermined angle. Further, it is possible to increase a sound-pickup level in the sound-pickup area by about 10 dB than sound-pickup levels of areas other than the sound-pickup area. In addition, it is possible to remove a noise source from the sound-pickup area by appropriately setting a virtual focus position, and thus noise is not picked up together with target sound.

BEST MODE FOR CARRYING OUT THE INVENTION

First Embodiment

Figure 1A:
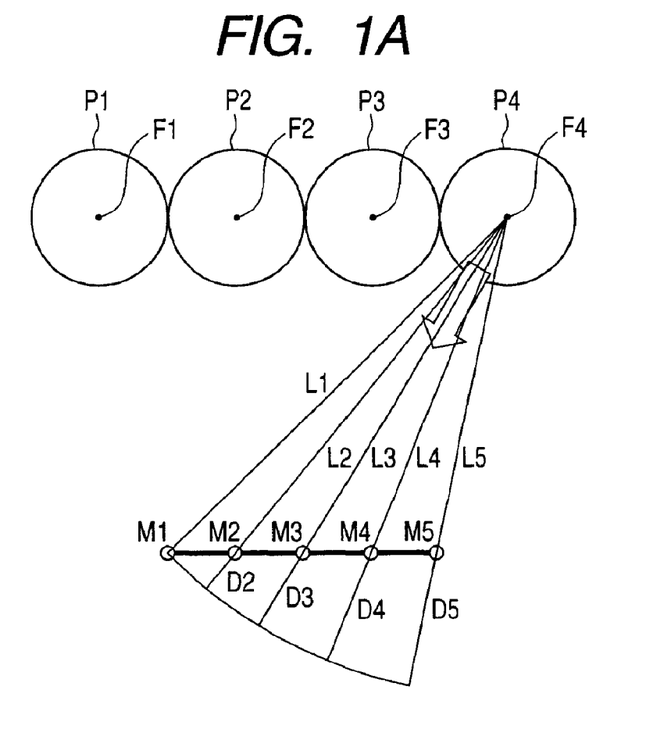
FIGS. 1A and 1B are diagrams illustrating two sound-pickup modes to be performed by a voice conference apparatus according to an embodiment of the invention.
Figure 1B:
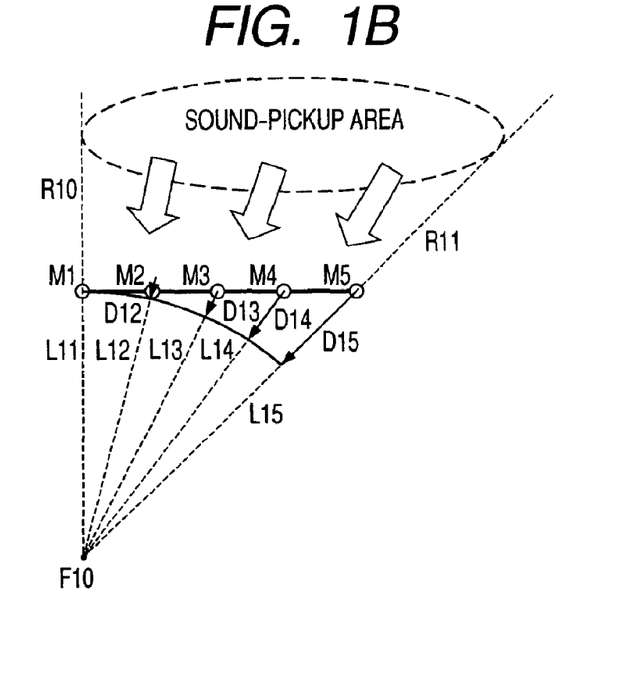
Figure 2A:
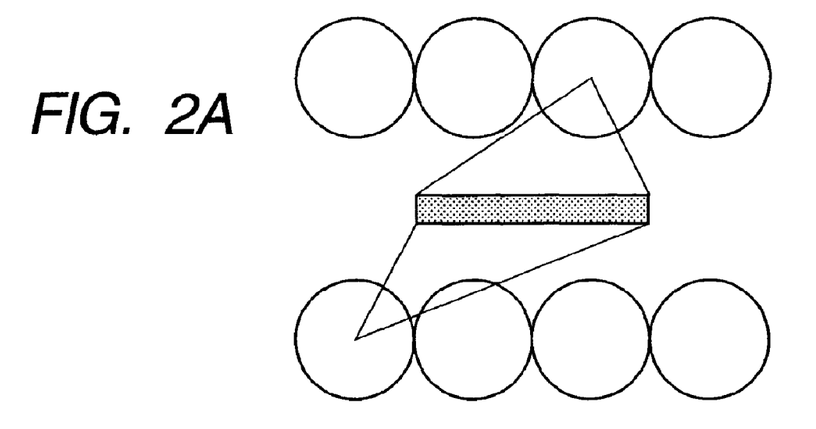
FIGS. 2A to 2C are diagrams showing an example of setting sound-pickup modes of a front side and a rear side of the voice conference apparatus.
Figure 2B:
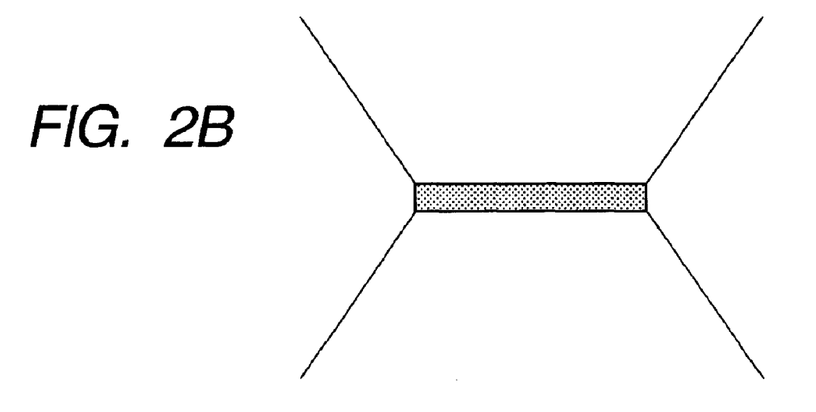
Figure 2C:
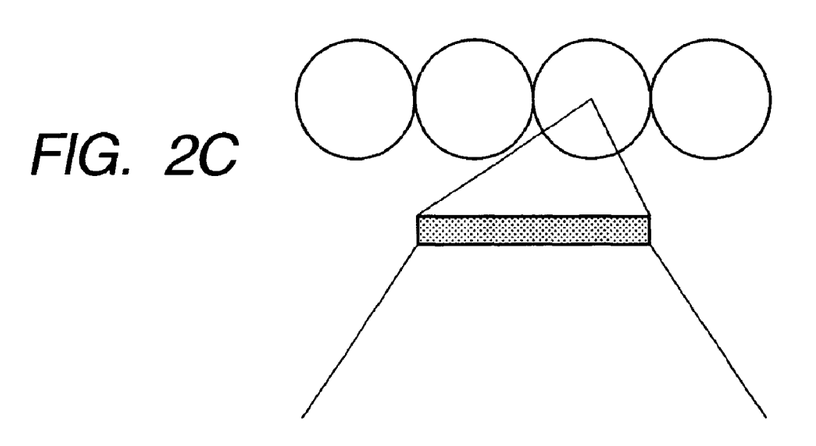

A voice conference apparatus according to a first embodiment of the invention will now be described with reference to the accompanying drawings. FIGS. 1 and 2 are diagrams illustrating functional characteristics of a voice conference apparatus.

The voice conference apparatus uses a microphone array including a plurality of microphones that are linearly arranged. The voice conference apparatus delays sound picked up by the individual microphones, and subsequently synthesizes picked up sound, so that sound-pickup directivity of the entire microphone array is controlled to act as a beam. Further, the voice conference apparatus pucks up sound (speaking) generated at a specific spot or area, which is a destination of a sound-pickup beam, at a high gain, and suppresses sound (noise) generated at other areas. In the present application, the beam of the sound-pickup directivity controlled to act as a beam is referred to as the sound-pickup beam.

In the voice conference apparatus according to this embodiment, the sound-pickup beam is controlled according to two modes. FIGS. 1A and 1B are diagrams illustrating the two modes. FIG. 1A is a diagram illustrating a first mode, which is a spot sound-pickup mode. FIG. 1B is a diagram illustrating a second mode, which is an area sound-pickup mode.

Referring to FIG. 1A, in the spot sound-pickup mode, a sound-pickup beam focused on a spot, from which a sound is picked up, is formed, and a narrow range of sound is picked up at a high gain. Here, sound-pickup spots P1, P2, P3, and P4 are set at positions where attendants sit, for example. Sound signals picked up by individual microphones M1 to M5 are delayed so that distances from the focus to the microphones picking up the sound signals are the same and the delayed sound signals are synthesized, thereby sound generated around the focus can be extracted at a high gain.

Here, the constant distance from the focus to the microphones means that, in the individual microphones, the sum of a physical distance between the microphone and the focus, and a value obtained by multiplying, by the sound speed, the delay time applied to the sound signal picked up by the microphone is the same.

In FIG. 1A, a sound-pickup beam focusing a focus F4 on the sound-pickup spot P4 is shown. A distance between the focus F4 and the farthest microphone M1 is L1. Distances between the focus F4 and the microphones M2, M3, M4, and M5 are L2, L3, L4 and L5, respectively. All the distances L2 to L5 are shorter than the distance L1. That is, sound generated at the focus F4 (or the sound-pickup area P4) reaches the microphones M2 to M5 earlier than the microphone M1. Therefore, in order that the signals picked up by the microphones M2 to M5 have the same timing as the signal picked up by the microphone M1, delays corresponding to differences D2 to D5 between the distances L2 to L5 and the distance L1 are provided to the signals picked up by the microphones M2 to M5, respectively. The differences D2 to D5 correspond to distances obtained by an equation $D2=c \times t2$ (the same is applied to D3 to D5) when delay times of the sound signals picked up by the microphones M2 to M5 are t2 to t5, respectively, and the sound speed is c.

As a result, it is possible to synchronize, in terms of timing and phase, the sound signals, which are generated at the sound-pickup spots around the focus, of the sound signals picked up by the individual microphones, and then synthesize the sound signals. It is also possible to increase only a level of sound that is generated at the sound-pickup spot. As to sound generated at other areas, since sound signals are synthesized in a state where the phases and timings of the sound signals are shifted from one another, the amplitude is cancelled among the individual sound signals, which makes it possible to suppress a gain.

In the spot sound-pickup mode, as shown in FIG. 1A, a plurality of sound-pickup spots (for example, four spots) are set to chairs or the like in the conference room, and sound-pickup beams is formed toward the sound-pickup spots, respectively. Further, the greatest sound signal of the sound signals picked up by the individual sound-pickup beams serves as a target sound signal (speaking), and is output to other conference apparatus.

Sound-pickup spot information for the picked-up sound signal is added to the picked-up sound signal, and is output. In case of the spot sound-pickup mode, it is possible to know the sound-pickup spot according to which sound-pickup beam is used to select the picked-up sound signal, and thus information for identifying the sound-pickup spot is transmitted.

FIG. 1B is a diagram illustrating an area sound-pickup mode. In this mode, a virtual focus F10 is set at the back of the microphone array, and sound signals toward the focus F10 are picked up by the microphone array. In this mode, a range between two rays R10 and R11 respectively passing through both ends M1 and M5 of the microphone array from the virtual focus F10 becomes a sound-pickup area.

In FIG. 1B, a microphone M1 is the closest to the virtual focus F10, and a distance therebetween is L11. Distances between the focus F10 and other microphones M2 to M5 are L12 to L15, respectively, and are longer than the distance L11. Therefore, in order that virtual distances between the focus F10 and the microphones M2 to M5 are the same as the distance L11 between the focus F10 and the microphone M1, delays corresponding to differences D12 to D15 between L12 to L15 and L11 are given to the signals picked up by the microphones M2 to M5. The differences D12 to D15 are calculated by the equation D12=c×t12 (the same is applied to D13 to D15) when delay times of the sound signals picked up by the microphones M2 to M5 are t12 to t15, and the sound speed is c.

Sound coming from the sound-pickup area is picked up by the individual microphones, and then timing adjustment is performed by the delays, such that sound is synthesized at the approximately same timing, which causes an increase in level. Meanwhile, sound coming from other areas other than the sound-pickup area is picked up by the individual microphones, and sound is synthesized in a state where the timings of sound are more shifted from one another due to the delays, such that a gain can be suppressed. As an experimental result, a sound-pickup level of sound coming from the sound-pickup area is 10 dB larger than that of sound coming from other areas other than the sound-pickup area.

Figure 7A:
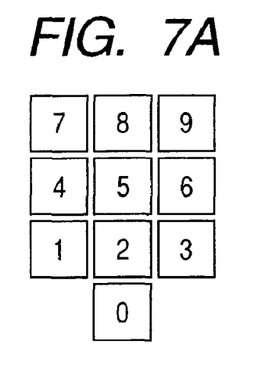
FIGS. 7A to 7C are diagrams illustrating a method of selecting a sound-pickup area in an area sound-pickup mode.
Figure 7B:
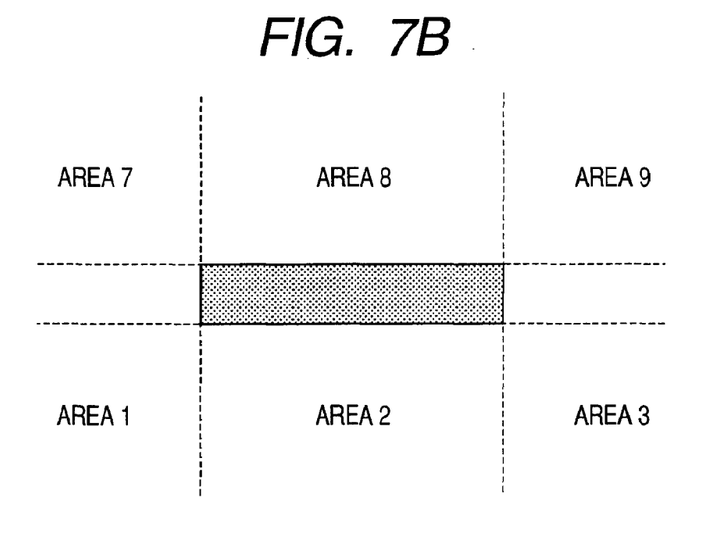
Figure 7C:
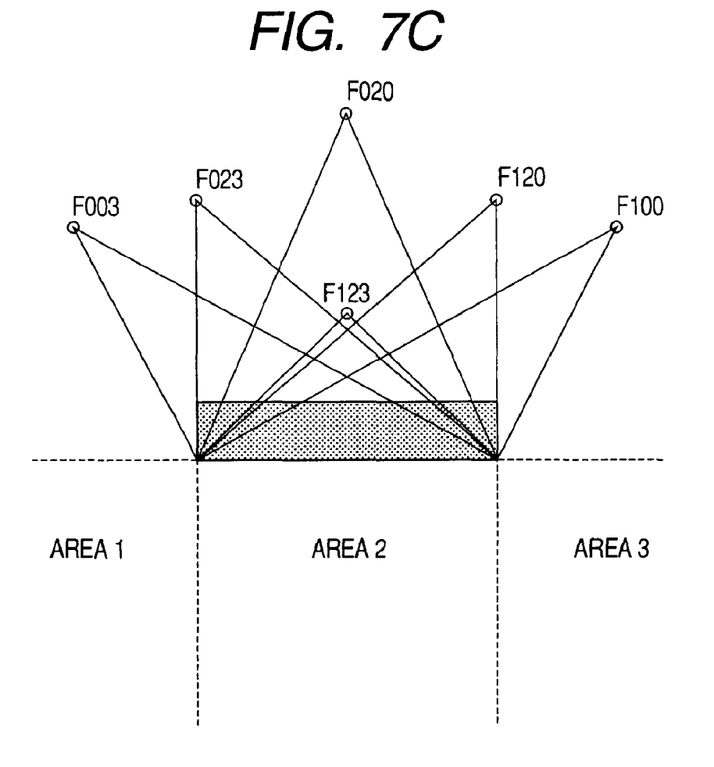

The position of the virtual focus in the area sound-pickup mode is not limited to the position of the virtual focus F10. For example, the position of the virtual focus may be set according to an area from which a sound is picked up. In the voice conference apparatus in this embodiment, as shown in FIG. 7C, a plurality of virtual focuses are previously set. Therefore, one is selected from the virtual focuses according to an area from which the user desires to pick up a sound.

In the area sound-pickup mode, a sound-pickup range is wider than that in the above-described spot sound-pickup mode, but a gain is not so high. However, it is possible to pick up sound from a large area, and it is also possible to accurately pick up sound without following the movement of the speaker.

Figure 3A:
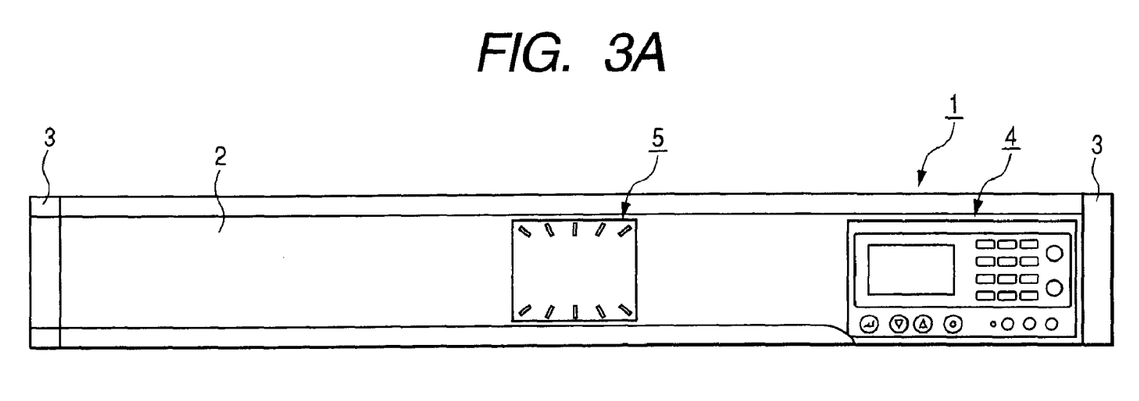
FIGS. 3A to 3C are front, rear, and side views showing the appearance of the voice conference apparatus.
Figure 3B:
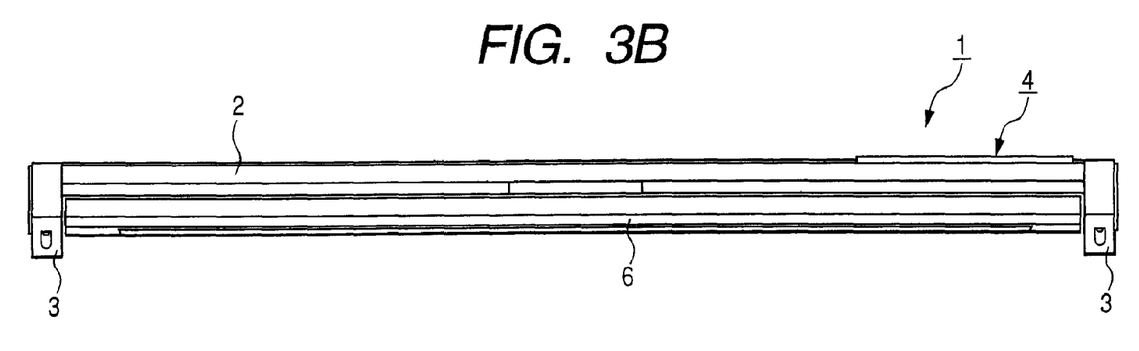
Figure 3C:
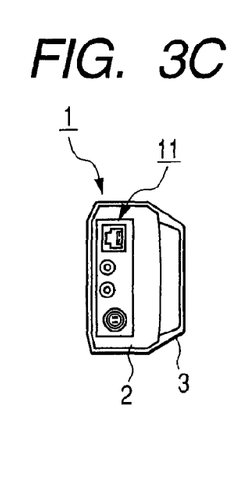

In an actual voice conference apparatus, as shown in FIG. 3, microphone arrays are formed on both sides (front and rear sides) of a long housing. The voice conference apparatus can pick up sound by separately setting a sound-pickup mode of each of the front side and the rear side to the spot sound-pickup mode or the area sound-pickup mode.

FIGS. 2A to 2C are diagrams showing an example of setting sound-pickup modes at front and rear sides of a voice conference apparatus. FIG. 2A is a diagram showing an example of setting spot sound-pickup modes on both front and rear sides of the voice conference apparatus. FIG. 2B is a diagram showing an example of setting area sound-pickup modes on both front and rear sides of the voice conference apparatus. FIG. 2C is a diagram showing an example of setting an area sound-pickup mode on a front side and a spot sound-pickup mode on a rear side. The example shown in FIG. 2C is used when one executive officer (a president or the like) sits at the back side of the conference room and other persons sit at the front side thereof.

Figure 4A:
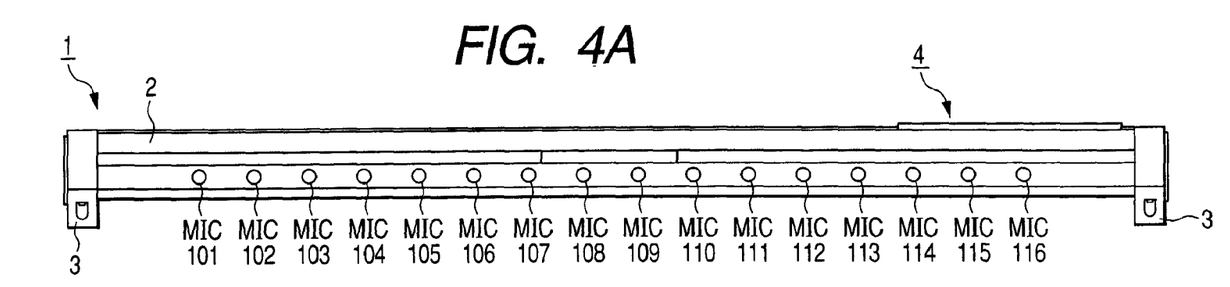
FIGS. 4A to 4C are diagrams showing a speaker arrangement and a microphone arrangement of the voice conference apparatus.
Figure 4B:
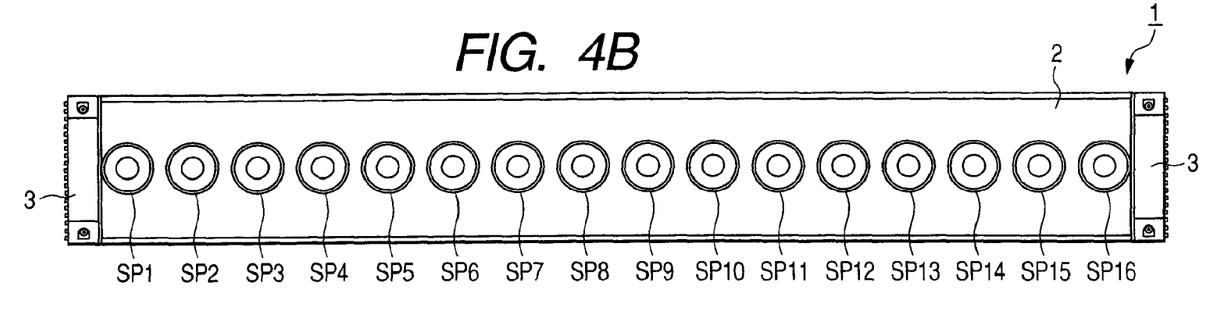
Figure 4C:
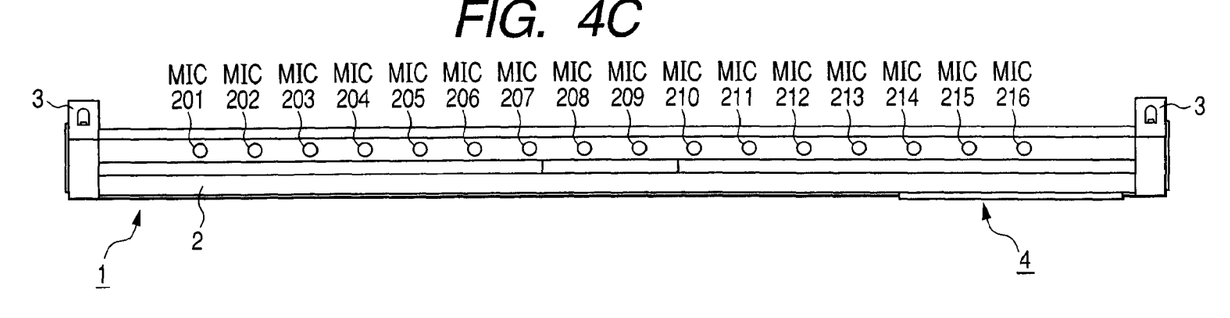

FIGS. 3A to 3C are diagrams showing three sides of a voice conference apparatus that pucks up sound in the above-described two modes. FIG. 3A is a plan view of the voice conference apparatus, FIG. 3B is a front view thereof, and FIG. 3C is a right side view thereof. FIGS. 4A to 4C are diagrams showing a speaker arrangement and a microphone arrangement of the voice conference apparatus shown in FIGS. 3A to 3C. FIG. 4A is a diagram showing the microphone arrangement on the front side of the voice conference apparatus, FIG. 4B is a diagram showing the speaker arrangement on the bottom surface thereof, and FIG. 4C is a diagram showing the microphone arrangement on the rear side thereof.

In the following description, a surface shown in FIG. 3B is referred to a front side, and top, bottom, left and right sides are determined on the basis of the front side.

The voice conference apparatus 1 has an appearance formed of a housing 2 and leg units 3. The housing 2 includes an operating unit 4, a light emitting unit 5, and an input/output connector panel 11. The housing 2 has an approximately rectangular parallelepiped shape having a horizontally long length. The leg units 3 are provided at left and right ends of the housing 2 so as to hold up the bottom surface of the housing 2 at a predetermined distance from an installation surface.

The operating unit 4 has operating buttons, such as a numeric keypad, or a display screen, and is provided at an upper right end of the housing 2. The operating unit 4 is connected to a control unit 10 provided in the housing 2. The operating unit 4 pucks up a control input from a user and outputs the same to the control unit 10. At the same time, the operating unit 4 displays a control content or an execution mode on the display screen according to the control of the control unit 10.

The control unit 10 sets a sound-pickup mode on the basis of the control of the operating button by the user. When an area sound-pickup mode is set, a sound-pickup area is also selected. When the spot sound-pickup mode is set, the four spots shown in FIG. 1A are automatically set.

The light emitting unit 5 is provided at a central portion of an upper surface of the housing 2. The light emitting unit 5 includes light emitting elements, such as LEDs, which are radially arranged on the basis of one point. The light emitting unit 5 emits light according to a light emission control by the control unit 10. The control unit 10 inputs a light-emission control signal to the light emitting unit 5 so as to cause the LEDs to emit light in a sound-pickup direction.

The input/output connector panel 11 is provided on the right side of the housing 2. The input/output connector panel 11 includes a LAN interface, an analog audio input terminal, an analog audio output terminal, and digital audio input/output terminals. Individual connectors of the input/output connector panel 11 are connected to the input/output interface (I/F) 12. In addition, a DC jack is provided in the input/output connector panel 11 so as to supply power.

Sixteen speakers SP1 to SP16 having the same specification are provided at the bottom of the housing 2. The speakers SP1 to SP16 are linearly provided in a longitudinal direction at predetermined intervals, such that a speaker array is formed. Microphones MIC101 to MIC116 having the same specification and microphones MIC201 to MIC216 having the same specification are provided on the front and rear sides of the housing 2, respectively. The microphones MIC101 to MIC116 and the microphones MIC201 to MIC216 are linearly provided in the longitudinal direction, such that microphone arrays are formed.

A bottom grill 6 is mounted on the bottom, and the front and rear sides so as to cover the speaker array and the microphone arrays. The bottom grill 6 has a U sectional shape and a gutter shape. The bottom grill 6 is formed of a metal plate having a punched mesh structure. Further, the bottom grill 6 protects the speakers SP1 to SP16, the microphones MIC101 to MIC116, and the microphones MI201 to MI216, and passes sound to be emitted and picked up.

The microphones MIC101 to MIC116, and a sound-pickup beam generating unit 181 (see FIG. 5) form sound-pickup beams on the front side shown in FIG. 2A to 2C. The microphones MIC201 to MIC216, and a sound-pickup beam generating unit 182 (see FIG. 5) form sound-pickup beams on the rear side shown in FIG. 2A to 2C.

In this embodiment, there are sixteen speakers in the speaker array and sixteen microphones in each of the microphone arrays. However, the invention is not limited to this configuration. The number of speakers and the number of microphones are appropriately set according to the specifications. Intervals in the speaker array and intervals in the microphone array are arbitrarily determined. That is, the microphones may be disposed at constant intervals or the microphones may be closely disposed at the center portion and loosely disposed toward both ends of the microphone array.

Figure 5:
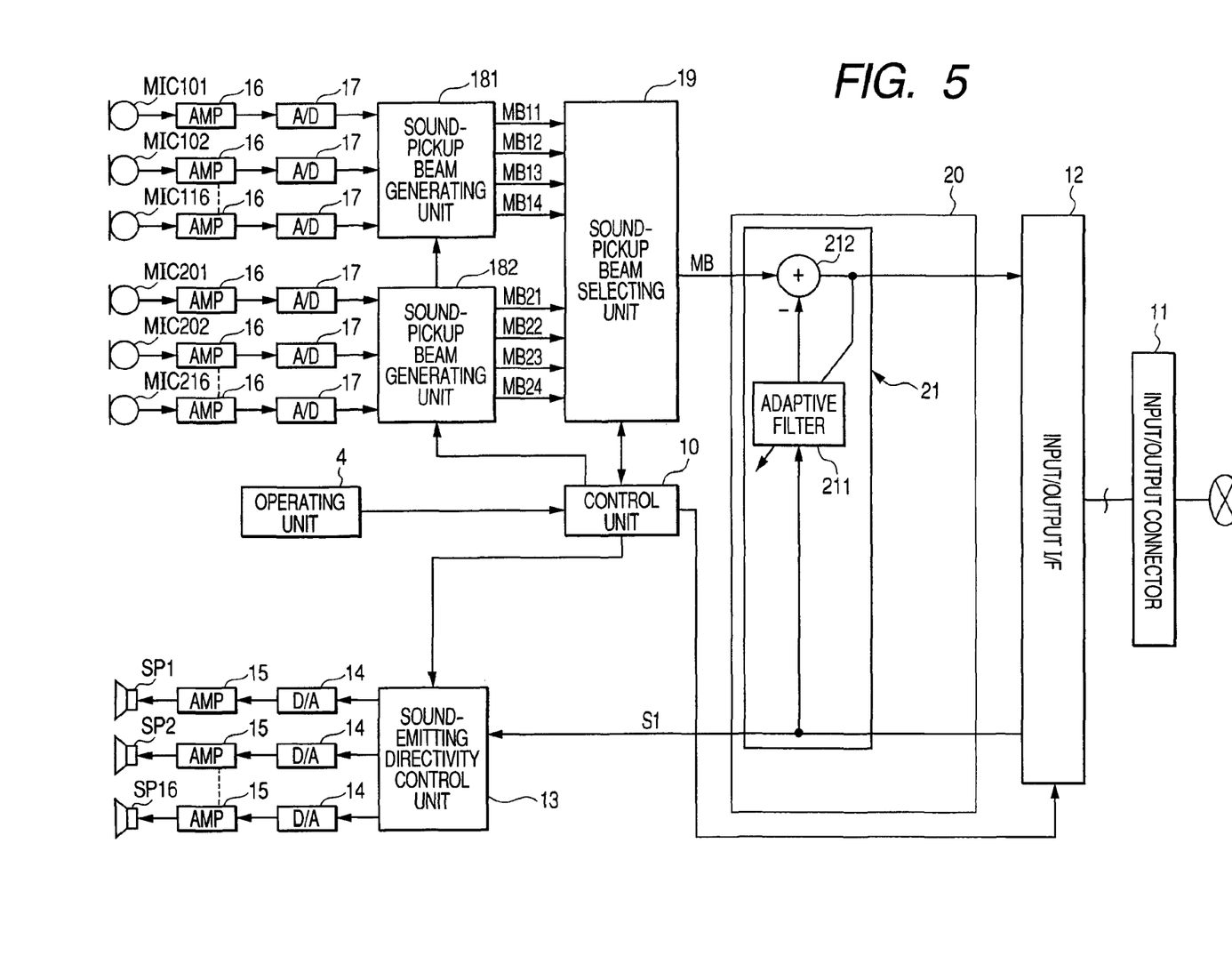
FIG. 5 is a block diagram showing the configuration of a signal processing system of the voice conference apparatus according to a first embodiment.

FIG. 5 is a block diagram showing the configuration of a signal processing system of the voice conference apparatus. The voice conference apparatus 1 functionally includes the control unit 10, the input/output connector panel 11, the input/output interface 12, a sound-emitting directivity control unit 13, D/A converters 14, sound-emitting amplifiers 15, the speaker array (speakers SP1 to SP16), the microphone arrays (microphones MIC101 to MIC116, and microphones MIC201 to MIC216), sound-pickup amplifiers 16, A/D converters 17, the sound-pickup beam generating unit 181, the sound-pickup beam generating unit 182, a sound-pickup beam selecting unit 19, an echo cancellation unit 20, and the operating unit 4.

The input/output interface 12 converts sound signals input from the individual connectors of the input/output connector panel 11 into digital sound signals of bit streams, and outputs the digital sound signals. The digital sound signals are supplied to the sound-emitting directivity control unit 13 through the echo cancellation unit 20. When the sound signals are input through a network or a LAN connector, the input/output interface 12 arranges the packetized sound signals in a time series manner, sequentially outputs the sound signals, and generates bit streams of the sound signals. When an analog signal is input through the analog audio input terminal, the input/output interface 12 digitizes the analog signal and outputs the digitized analog signal.

The echo cancellation unit 20 is a functional unit that prevents an echo phenomenon. The echo phenomenon is that "sound signals input from the input/output interface 12 are emitted from the speakers SP1 to SP16, and the emitted sound signals regress to the microphones MIC101 to 116 and the microphones MIC201 to 216 and are output again from the input/output interface 12." The echo cancellation unit 20 estimates regression sound on a path by using an adaptive filter 211, and decreases estimated regression sound from the sound signals picked up by the microphones, such that the echo can be suppressed. The configuration and operation of the echo cancellation unit 20 will be described in detail below.

The sound-emitting directivity unit 13 is a functional unit that generates sound-emitting signals to be respectively supplied to the speakers SP1 to SP16 of the speaker array based on the sound signals supplied from the input/output interface 12. The sound-emitting directivity control unit 13 generates sound-emitting signals, which are respectively supplied to the speakers, so as to emit a sound-emitting beam, which is a beam of sound from the speaker array. Accordingly, the sound-emitting directivity control unit 13 separately performs predetermined delay processing and amplitude processing on the input sound signals.

Here, in the same manner as the sound-pickup beam shown in FIGS. 1A to 2C, the sound-emitting beam includes a spot type sound-emitting beam which emits sound such that sound signals converges on a focus set in a sound-emitting direction, and an area type sound-emitting beam which emits sound at a wavefront where sound signals are diffused from a virtual focus set at the back of the sound-emitting direction. It is possible to switch between two types of sound-emitting beams according to the modes set by the control of the control unit 10.

The sound-emitting directivity control unit 13 outputs the generated sound-emitting signals to the D/A converters 14 that are respectively provided at the speakers SP1 to SP16. Each of the D/A converters 14 converts the sound-emitting signal into an analog format and outputs the converted sound-emitting signal to each of the sound-emitting amplifiers 15. The individual sound-emitting amplifiers 15 amplify the sound-emitting signals and supply the amplified sound-emitting signals to the speakers SP1 to SP16, respectively.

Each of the speakers SP1 to SP16 performs a sound conversion of the sound-emitting signal and emits the converted sound-emitting signal to the outside. Since the speakers SP1 to SP16 are provided downward at the bottom of the housing 2, emitted sound is reflected from the installation surface of a desk where the voice conference apparatus 1 is provided. Therefore, reflected sound propagates on the skew obliquely upward from a lateral side of the apparatus at which the attendant is located.

The microphones MIC101 to MIC116 and the microphones MIC201 to MIC216 of the microphone arrays pick up sound on the front side and the rear side of the voice conference apparatus 1, respectively, convert picked-up sound into the electrical sound signals and output the sound signals to the sound-pickup amplifiers 16, respectively. The individual sound-pickup amplifiers 16 amplify the sound signals and supply the amplified sound signals to the A/D converters 17. The A/D converters 17 convert the analog sound signals into digital signals, and output the converted digital signals to the sound-pickup beam generating units 181 and 182. Here, the sound signals on the front side picked up by the individual microphones MIC 101 to MIC 116 are input to the sound-pickup beam generating unit 181. Further, the sound signals on the rear side picked up by the microphones MIC201 to MIC216 are input to the sound-pickup beam generating unit 182.

On the basis of a sound-pickup mode instructed by the control unit 10, each of the sound-pickup beam generating unit 181 and the sound-pickup beam generating unit 182 performs a delay processing on the sound signals picked up by the individual microphones so as to form one of the spot type sound-pickup beam and the area type sound-pickup beam shown in FIGS. 1A to 2C.

Figure 6:
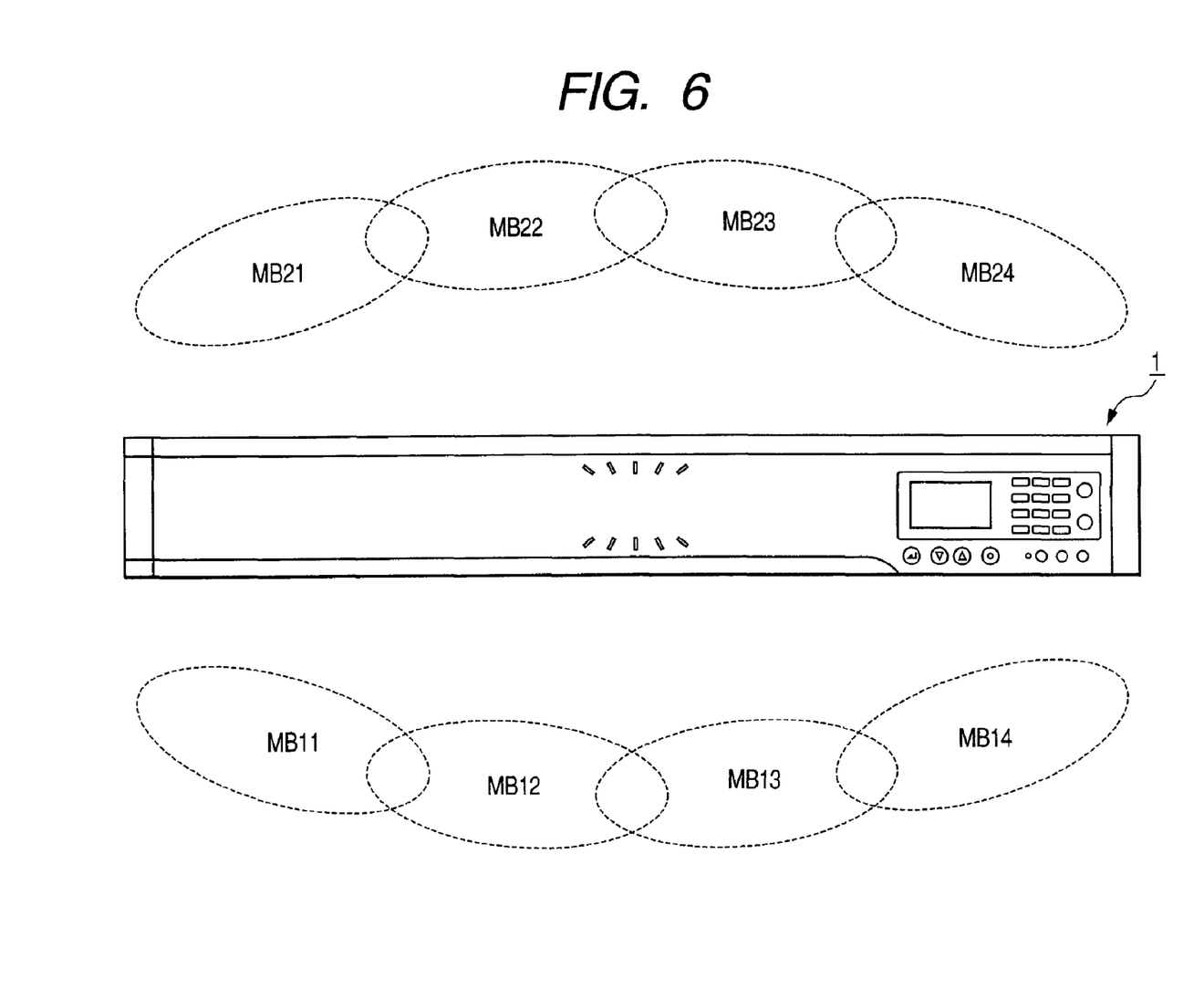
FIG. 6 is a diagram showing setting states of sound-pickup spots when spot sound-pickup modes are set for both the front side and the rear side.

Here, when the spot sound-pickup mode is set on both sides as shown in FIG. 2A, sound-pickup beams MB11 to MB14, and sound-pickup beams MB21 to MB24 are formed with respect to a plurality of spots (four spots on the front side and four spots on the rear side in FIG. 6) at the same time as shown in FIG. 6. Of the sound signals of the eight spots picked up by the eight sound-pickup beams, the sound signal of the highest level is a target sound signal (that is, the attendant's speaking in the conference, not noise). This sound signal is output to the echo cancellation unit 20 of a following stage. The sound signal is selected by the sound-pickup beam selecting unit 19.

Meanwhile, when the area sound-pickup mode is set on both sides as shown in FIG. 2B, one area is set on each of the front side and the rear side, and sound-pickup beams are set so as to pick up sound from the set areas. Between the two sound-pickup beams, the sound-pickup beam of a higher level is a target sound signal (that is, the attendant's speaking in the conference, not noise). This sound signal is output to the echo cancellation unit 20 of the following stage. The sound signal is selected by the sound-pickup beam selecting unit 19.

When the spot sound-pickup mode is set on one side, and the area sound-pickup mode is set on the other side as shown in FIG. 2C, in the spot type sound-pickup mode, sound-pickup beams are formed to be focused on a plurality of sound-pickup spots, and in the area sound-pickup mode, one sound-pickup beam is formed. Of the sound signals picked up by the five sound-pickup beams, the sound signal of the highest level is a target sound signal (that is, the attendant's speaking in the conference, not noise). This sound signal is output to the echo cancellation unit 20 of the following stage. The sound signal is selected by the sound-pickup beam selecting unit 19.

The echo cancellation unit 20 includes an adaptive echo canceller 21. The adaptive echo canceller 21 includes the adaptive filter 211 and a post processor 212. The adaptive filter 211 estimates a sound signal component that regresses to a microphone MIC on the basis of a sound signal supplied to a speaker SP, and generates a pseudo-regression sound signal. The post processor 212 subtracts the pseudo-regression signal for an input sound signal S1 from the sound signal selected and output by the sound beam selecting unit 19. The sound signal, from which the echo component is removed, is input to the input/output interface 12.

As the above-described echo cancellation processing is performed, it is possible to accurately predict and remove the sound signal that regresses to the microphone MIC from the speaker SP. It is also possible to output only the sound signal picked up by the microphone MIC from the input/output interface 12.

Next, with reference to FIGS. 7A to 7C, a method of selecting a sound-pickup area in the area sound-pickup mode will be described. A sound-pickup area in the area type sound-pickup mode is selected using the numeric keypad provided in the operating unit 4 at the upper surface of the housing 2. The numeric keypad is provided in a front-side direction. Keys 1 to 9 of the numeric keypad are arranged in such a manner that 1, 2, and 3 are arranged from lower left to lower right, 4, 5, and 6 are arranged from central left to central right, and 7, 8, and 9 are arranged from upper left to upper right. The keys 1, 2, and 3 correspond to a left area (area 1), a central area (area 2), and a right area (area 3) of the front side. The keys 7, 8, and 9 correspond to a left area (area 7), a central area (area 8), and a right area (area 9) of the rear side. To select a sound-pickup area, the user presses a key corresponding to the desired sound-pickup area, and thus the control unit 10 selects the area as the sound-pickup area.

With reference to FIG. 7C, a sound-pickup beam that is formed in response to the selected sound-pickup area will be described. FIG. 7C is a diagram illustrating sound-pickup beams formed at the front side. When the area 1 is selected, a sound-pickup beam toward a virtual focus F100 of the rear right side of the microphone array is formed so as to synthesize the picked-up sound signals. When the area 2 is selected, a sound-pickup beam toward a virtual focus F020 of the distant rear center of the microphone array is formed so as to synthesize the picked-up sound signals. When the area 3 is selected, a sound-pickup beam toward a virtual focus F003 of the rear left side of the microphone array is formed so as to synthesize the picked-up sound signals.

Sound-pickup beams formed in response to the sound-pickup areas of the rear side are obtained by inverting the front side of FIG. 7C. Therefore, the descriptions thereof will be omitted.

When the area 1 and the area 2 are selected by pressing the key 1 and the key 2, a sound-pickup beam toward the virtual focus F120 between the virtual focus F100 and the virtual focus F020 is formed so as to synthesize the picked-up sound signals. When the area 2 and the area 3 are selected by pressing the key 2 and the key 3, a sound-pickup beam toward a virtual focus F023 between the virtual focus F003 and the virtual focus F020 is formed to synthesize the picked-up sound signals. When the key 1, the key 2, and the key 3 are pressed (that is, the entire front side of the microphone array is selected), a sound-pickup beam toward a virtual focus F123 in the vicinity of the rear center of the microphone array is formed so as to synthesize the picked-up sound signals.

In such a manner, selection of the sound-pickup area is received by the numeric keypad, and a virtual focus is set in which the selected sound-pickup area is interposed between two rays connected to both ends of the microphone array from the virtual focus. Accordingly, it is possible for the user to select a desired sound-pickup area by a simple operation.

The association of each of the sound-pickup areas with the numeric keypad, and the virtual focus position for picking up sound from each of the sound-pickup areas are stored in a memory (not shown) of the control unit 10. The control unit 10 reads the virtual focus position according to the selection operation of the user for the sound-pickup area (pressing of the numeric keypad), and sets the read virtual focus positions to the sound-pickup beam generating units 181 and 182.

In the area sound-pickup mode, sound generated from a wide sound-pickup area is collectively picked up, and thus it is difficult to find positions where sound is generated. Therefore, in the area sound-pickup mode, a signal processing in a spot sound-pickup mode may also be performed so as to detect a position of a sound source. That is, sound signals are picked up from a plurality of sound-pickup spots by the signal processing in the spot sound-pickup mode. Further, of the plurality of sound-pickup spots, the sound-pickup spot, at which the sound signal of the highest volume is picked up, is determined as a position of the sound source.

Even though the processing in the spot type sound-pickup mode is performed, if a purpose is only to specify the position of the sound source, sound quality does not need to be considered, unlike a case where sound signals for the conference are picked up. Therefore, picked-up sound is filtered through a high-pass filter, and only sound signals of about 1 kHz to 3 kHz that have high directivity are used.

Second Embodiment

A second embodiment of the invention is a modification of the first embodiment. In the second embodiment, the same parts as those in the first embodiment are denoted by the same numerals, and thus a description thereof will be omitted.

The second embodiment is related to a TV conference system in which a camera for capturing an image of the conference room is installed in the voice conference apparatus.

Figure 8:
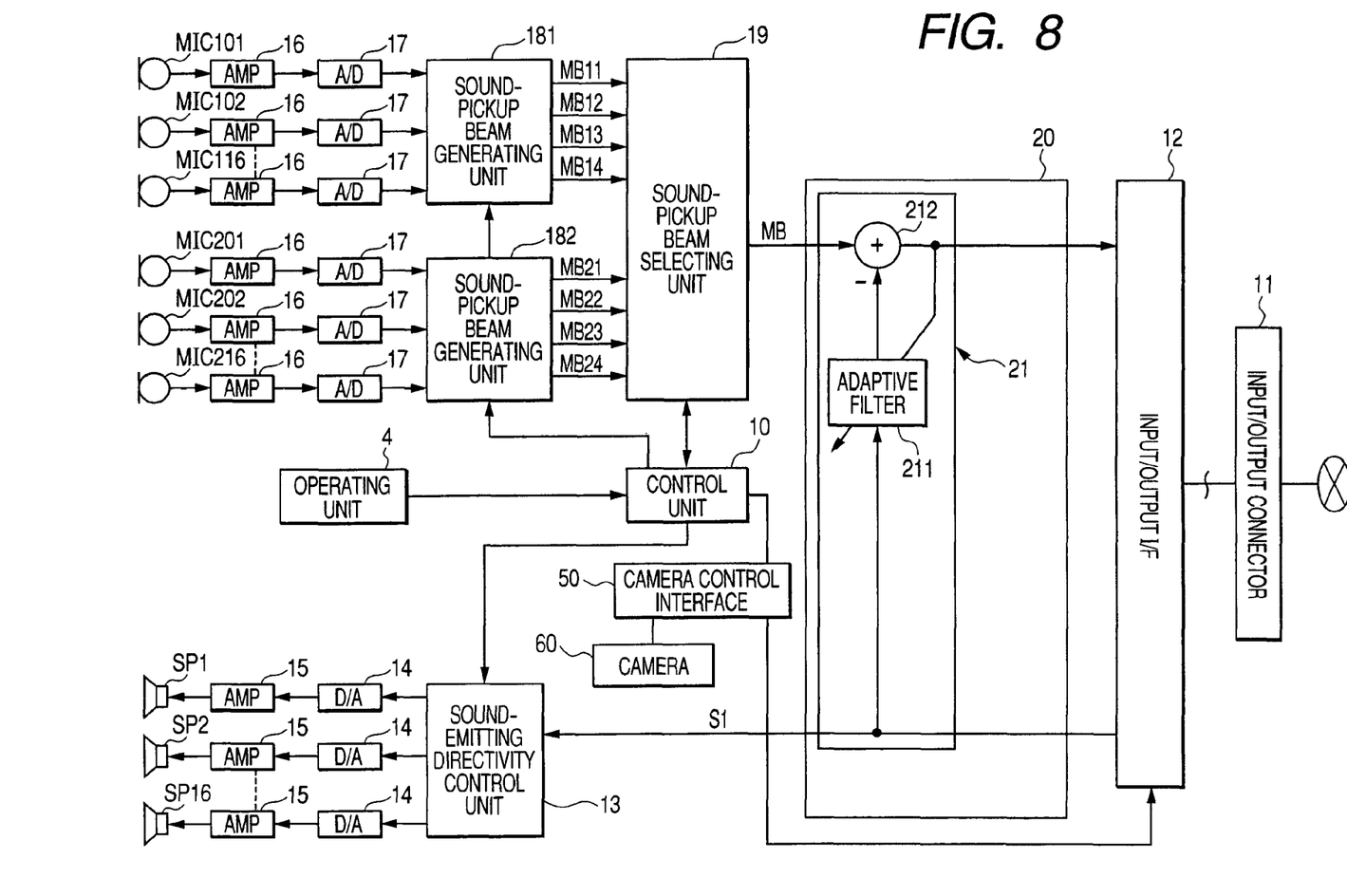
FIG. 8 is a block diagram showing the configuration of a TV conference system according to a second embodiment.
Figure 9:
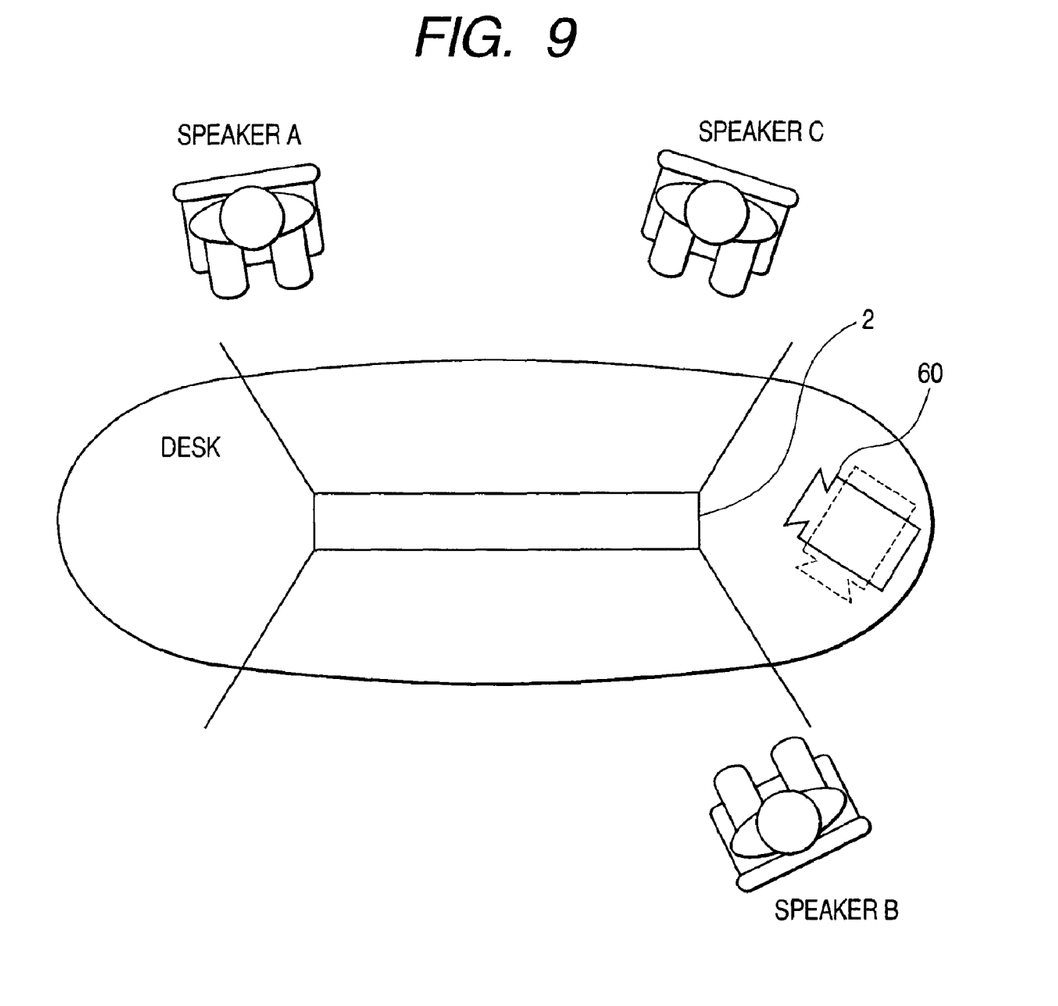
FIG. 9 is a top view showing a conference room where the TV conference system is installed.

FIG. 8 is a block diagram showing the configuration of the TV conference system according to the second embodiment. FIG. 9 is a top view showing a conference room where the TV conference system is installed.

The configuration of the TV conference system according to the second embodiment is different from that of the voice conference apparatus according the first embodiment in that a camera control interface 50 connected to the control unit 10 and a camera 60 for capturing an image of the conference room are installed in the system.

The camera 60 is arranged on the desk of the conference room and is designed to be rotatable with respect to the desk so that the camera can follow the sound source (speaker). The camera control interface 50 can control the camera 60 so as to be directed toward the sound source based on the obtained sound source position information. Video data obtained by the camera 60 is output through the camera control interface 50, the input/output I/F 12 and the input/output connector 11.

With reference to FIG. 9, one example of processing executed by the camera control interface 50 will be described. In the case that both the area sound-pickup mode and the spot sound-pickup mode are set on both the front side and the rear side, all sounds made by speakers A, B and C in the conference room can be picked up in virtue of the area sound-pickup mode, and a position of the sound source can be detected in virtue of the spot sound-pickup mode as described above. In the second embodiment, the detected position of the sound source is used for controlling the camera 60 so as to be directed toward the sound source. That is, if the speaker A is speaking, the position of the speaker A is detected, and the camera control interface 50 controls the camera 60 to be directed toward the speaker A as indicated by a solid line based on the detected result. On the other hand, if the speaker B is speaking, the position of the speaker B is detected and the camera control interface 50 controls the camera 60 to be directed toward the speaker B as indicated by a dotted line based on the detected result. Accordingly, it is possible to cause the camera to follow the main sound source by detecting the position of the main speaker and directing the camera toward the main speaker based on the detected position while sounds made by the all speakers in the conference room are picked up in the area sound-pickup mode.

In the second embodiment, the camera 60 is provided separately from the housing 2 and is connected to the cameral control interface 50 through a cable. Alternatively, the camera 60 may be assembled in the housing 2.

In the above-described embodiment, the area sound-pickup mode and the spot sound-pickup mode can be selected on each of the front side and the rear side. Alternatively, both the area sound-pickup mode and the spot sound-pickup mode may be selected on the same side of the microphone array. In this case, the sound-pickup beam selecting unit 19 selects and outputs sound signals picked up according to any one of the area sound-pickup mode and the spot sound-pickup mode. Further, the sound-pickup beam selecting unit 19 outputs sound signals that are obtained by synthesizing the sound signals picked up in both modes.

As the area sound-pickup operation and the spot sound-pickup operation are performed at the same time, sound signals that are obtained by synthesizing sound signals according to both of the operations are output. As a result, sound of a certain level is picked up in a wider range, and sound of a specific spot where an attention is attracted (or a spot at which a speaker does not move, for example, a spot in the vicinity of a president's chair) can be picked up as sound of a high level and quality.

While the area sound-pickup operation and the spot sound-pickup operation are performed at the same time, the sound-pickup beam selecting unit 19 compares a signal level of the entire area with a signal level of a specific spot. Further, the sound-pickup beam selecting unit 19 automatically selects sound signals of the area sound-pickup operation or sound signals of the spot sound-pickup operation, and outputs the selected sound signals.

In this embodiment, the microphone array is formed of a line array. However, the microphone array is not limited to the line array, but may be an array in a matrix shape.

The invention claimed is:

1. A sound pickup device comprising:
a microphone array including a plurality of microphones configured to pick up sound signals; and
a signal processing unit configured to perform an area sound-pickup processing in which a virtual focus is set in a direction opposite to a sound-pickup area where sound is to be picked up by the plurality of microphones, the area sound-pickup processing including generating distance-equalized sound signals from the sound signals picked up by the plurality of microphones by adding delays to the sound signals picked up by the plurality of microphones that equalize distances from the plurality of microphones to the virtual focus, and the area sound-pickup processing including synthesizing the distance-equalized sound signals.

2. The sound pickup device according to claim 1 further comprising:
a storage unit configured to store information regarding a plurality of sound-pickup areas and information regarding a plurality of virtual focuses for respectively picking up sound from the plurality of sound-pickup areas; and
an area selecting unit configured to select at least one area from the plurality of sound-pickup areas,
wherein the signal processing unit is configured to set the virtual focus(es) corresponding to the sound-pickup area(s) selected by the area selecting unit.

3. The sound pickup device according to claim 1,
wherein the sound signals picked up by the plurality of microphones are first sound signals,
wherein the distance-equalized sound signals are first distance-equalized sound signals,
wherein the signal processing unit is configured to perform a spot sound-pickup processing in which a focus is set to a sound-pickup spot,
wherein the spot sound-pickup processing includes generating second distance-equalized sound signals from second sound signals picked up by the plurality of microphones by adding delays to the second sound signals picked up by the plurality of microphones that equalize distances from the plurality of microphones to the sound-pickup spot,
wherein the spot sound-pickup processing includes synthesizing the second distance-equalized sound signals, and
wherein the sound-pickup spot occupies a smaller space than the sound-pickup area.

4. The sound pickup device according to claim 3,
wherein the signal processing unit is configured to selectively output the synthesized first distance-equalized sound signals or the synthesized second distance-equalized sound signals.

5. The sound pickup device according to claim 3, further comprising a mode selecting unit configured to receive a signal indicating a selection of the spot sound-pickup processing or the area sound-pickup processing, and to instruct the signal processing unit to perform the selected processing.

6. The sound pickup device according to claim 3,
wherein the signal processing unit is configured to perform a sound source detection processing in which the spot sound-pickup processing is performed for each of a plurality of sound-pickup spots which are set within the sound-pickup area, and to output, as a sound source position, a position of the sound-pickup spot of the plurality of sound-pickup spots at which volume of the synthesized second distance-equalized sound signals becomes maximum.

7. The sound pickup device of claim 5,
wherein the microphone array is a first microphone array,
wherein the signal processing unit is a first signal processing unit provided for the first microphone array, wherein the sound pickup device further comprises a second microphone array and a second signal processing unit provided for the second microphone array, wherein the first and second microphone arrays are respectively provided facing away from each other on two opposing surfaces, and wherein the mode selecting unit is configured to separately instruct the first and second sound signal processing units to independently perform the spot sound-pickup processing, the area sound-pickup processing, or both the spot sound-pickup processing and the area sound-pickup processing.

8. A voice conference apparatus comprising:

a housing;

two microphone arrays that are provided outward on a front surface and a rear surface of the housing, each of the microphone arrays including a plurality of microphones arranged therein;

a speaker array including a plurality of speakers linearly arranged at a bottom of the housing;

two sound signal processing units that are provided for the two microphone arrays, respectively, wherein each of the sound signal processing units is configured to perform:

an area sound-pickup processing in which a virtual focus is set in a direction opposite to a sound-pickup area where sound is to be picked up by the corresponding plurality of microphones, the area sound-pickup processing including generating first distance-equalized sound signals from first sound signals picked up by the corresponding plurality of microphones by adding delays to the first sound signals picked up by the corresponding plurality of microphones that equalize distances from the corresponding plurality of microphones to the virtual focus, and the area sound-pickup processing including synthesizing the first distance-equalized sound signals, and a spot sound-pickup processing in which a focus is set to a sound-pickup spot, the spot sound-pickup processing including generating second distance-equalized sound signals from second sound signals picked up by the corresponding plurality of microphones by adding delays to the second sound signals picked up by the plurality of microphones that equalize distances from the corresponding plurality of microphones to the sound-pickup spot, and the spot sound-pickup processing including synthesizing the second distance-equalized sound signals;

a mode selecting unit configured to receive a signal indicating a selection of the spot sound-pickup processing or the area sound-pickup processing, and to instruct either or both of the signal processing units to perform the selected processing; and a sound-emitting signal processing unit configured to supply a sound-emitting signal to the speaker array.

9. The voice conference apparatus according to claim 8 further comprising a camera for capturing an image of a conference room, wherein each of the signal processing units are configured to perform a sound source detection processing in which the spot sound-pickup processing is performed for each of a plurality of sound-pickup spots which are set within the sound-pickup area, and in which a sound source position is detected as a position of the sound-pickup spot of the plurality of sound-pickup spots at which volume of the synthesized second distance-equalized sound signals becomes maximum, and wherein the voice conference apparatus further comprises a control unit configured to control the camera to be directed to the detected sound source position.

10. The sound pickup device according to claim 2, wherein the sound signals picked up by the plurality of microphones are first sound signals, wherein the distance-equalized sound signals are first distance-equalized sound signals, wherein the signal processing unit is configured to perform a spot sound-pickup processing in which a focus is set to a sound-pickup spot, wherein the spot sound-pickup processing includes generating second distance-equalized sound signals from second sound signals picked up by the plurality of microphones by adding delays to the second sound signals picked up by the plurality of microphones that equalize distances from the plurality of microphones to the sound-pickup spot, wherein the spot sound-pickup processing includes synthesizing the second distance-equalized sound signals, and wherein the sound-pickup spot occupies a smaller space than each of the plurality of sound-pickup areas.

11. A sound pickup method comprising:

a sound pickup step of picking up sound signals from a microphone array including a plurality of microphones; and a signal processing step of performing an area sound-pickup processing in which a virtual focus is set in a direction opposite to a sound-pickup area where sound is to be picked up by the plurality of microphones, the area sound-pickup processing including generating distance-equalized sound signals from the sound signals picked up by the plurality of microphones by adding delays to the sound signals picked up by the plurality of microphones that equalize distances from the plurality of microphones to the virtual focus, and the area sound-pickup processing including synthesizing the distance-equalized sound signals.

12. The sound pickup method according to claim 11 further comprising:

a storage step of storing information in a storage unit regarding a plurality of sound-pickup areas and information regarding a plurality of virtual focuses for respectively picking up sound from the plurality of sound-pickup areas; and an area selecting step of selecting at least one area from the plurality of sound-pickup areas, wherein the signal processing step includes setting the virtual focus(es) corresponding to the sound-pickup area(s) selected in the area selecting step.

13. The sound pickup method according to claim 11, wherein the sound signals picked up by the plurality of microphones are first sound signals, wherein the distance-equalized sound signals are first distance-equalized sound signals, wherein the signal processing step includes performing a spot sound-pickup processing in which a focus is set to a sound-pickup spot, wherein the spot sound-pickup processing includes generating second distance-equalized sound signals from second sound signals picked up by the plurality of microphones by adding delays to the second sound signals picked up by the plurality of microphones that equalize distances from the plurality of microphones to the sound-pickup spot, wherein the spot sound-pickup processing includes synthesizing the second distance-equalized sound signals, and wherein the sound-pickup spot occupies a smaller space than the sound-pickup area.

14. The sound pickup method according to claim 13, wherein the signal processing step includes selectively outputting the synthesized first distance-equalized sound signals or the synthesized second distance-equalized sound signals.

15. The sound pickup method according to claim 13, further comprising a mode selecting step of receiving a signal indicating a selection of the spot sound-pickup processing or the area sound-pickup processing, and instructing a signal processing unit to perform the selected processing.

16. The sound pickup method according to claim 13, wherein the signal processing step includes performing a sound source detection processing in which the spot sound-pickup processing is performed for each of a plurality of sound-pickup spots which are set within the sound-pickup area, and outputting, as a sound source position, a position of the sound-pickup spot of the plurality of sound-pickup spots at which volume of the synthesized second distance-equalized sound signals becomes maximum.

17. The sound pickup method of claim 15, wherein the sound pickup method is implemented by a sound pickup device comprising the microphone array, wherein the microphone array is a first microphone array, wherein the signal processing step is implemented by a first signal processing unit of the sound pickup device and provided for the first microphone array, wherein the sound pickup device further comprises a second microphone array and a second signal processing unit provided for the second microphone array, wherein the first and second microphone arrays are respectively provided facing away from each other on two opposing surfaces, and wherein the mode selecting step includes separately instructing the first and second sound signal processing units to independently perform the spot sound-pickup processing, the area sound-pickup processing, or both the spot sound-pickup processing and the area sound-pickup processing.

18. A voice conference method implemented by a voice conferencing apparatus including a housing; two microphone arrays provided outward on a front surface and a rear surface of the housing, each of the microphone arrays including a plurality of microphones arranged therein; a speaker array including a plurality of speakers linearly arranged at a bottom of the housing; and two sound signal processing units provided for the two microphone arrays, respectively, the method comprising:

an area sound-pickup processing step performed by both sound signal processing units in which a virtual focus is set in a direction opposite to a sound-pickup area where sound is to be picked up by the corresponding plurality of microphones, the area sound-pickup processing step including generating first distance-equalized sound signals from first sound signals picked up by the corresponding plurality of microphones by adding delays to the first sound signals picked up by the corresponding plurality of microphones that equalize distances from the corresponding plurality of microphones to the virtual focus, and the area sound-pickup processing step including synthesizing the first distance-equalized sound signals;

a spot sound-pickup processing step performed by both sound signal processing units in which a focus is set to a sound-pickup spot, the spot sound-pickup processing step including generating second distance-equalized sound signals from second sound signals picked up by the corresponding plurality of microphones by adding delays to the second sound signals picked up by the plurality of microphones that equalize distances from the corresponding plurality of microphones to the sound-pickup spot, and the spot sound-pickup processing step including synthesizing the second distance-equalized sound signals;

a mode selecting step of receiving a signal indicating a selection of the spot sound-pickup processing or the area sound-pickup processing, and instructing either or both of the signal processing units to perform the selected processing; and a sound-emitting signal processing step of supplying a sound-emitting signal to the speaker array.

19. The voice conference method according to claim 18, wherein the voicing conferencing apparatus includes a camera for capturing an image of a conference room, and wherein the method further comprises:

a sound source detection processing step performed by each of the signal processing units in which the spot sound-pickup processing is performed for each of a plurality of sound-pickup spots which are set within the sound-pickup area, and in which a sound source position is detected as a position of the sound-pickup spot of the plurality of sound-pickup spots at which volume of the synthesized second distance-equalized sound signals becomes maximum; and a controlling step of controlling the camera to be directed to the detected sound source position.

20. The sound pickup method according to claim 12, wherein the sound signals picked up by the plurality of microphones are first sound signals, wherein the distance-equalized sound signals are first distance-equalized sound signals, wherein the signal processing step includes performing a spot sound-pickup processing in which a focus is set to a sound-pickup spot, wherein the spot sound-pickup processing includes generating second distance-equalized sound signals from second sound signals picked up by the plurality of microphones by adding delays to the second sound signals picked up by the plurality of microphones that equalize distances from the plurality of microphones to the sound-pickup spot, wherein the spot sound-pickup processing includes synthesizing the second distance-equalized sound signals, and wherein the sound-pickup spot occupies a smaller space than each of the plurality of sound-pickup areas.

* * * * *